(12) United States Patent
Sticht et al.

(10) Patent No.: US 11,053,979 B2
(45) Date of Patent: Jul. 6, 2021

(54) BEARING RING

(71) Applicant: Aktiebolaget SKF, Gothenburg (DE)

(72) Inventors: Martina Sticht, Sennfeld (DE); Fred Menig, Sulzthal (DE); Juergen Reichert, Donnersdorf (DE); Jesko-Henning Tanke, Schweinfurt (DE); Gerhard Wagner, Prichsenstadt (DE); Michael Wendel, Bremen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/508,416

(22) Filed: Jul. 11, 2019

(65) Prior Publication Data
US 2020/0040944 A1 Feb. 6, 2020

(30) Foreign Application Priority Data
Jul. 31, 2018 (DE) .......................... 102018212775.1

(51) Int. Cl.
*F16C 33/58* (2006.01)
*F16C 33/64* (2006.01)
*C21D 9/40* (2006.01)

(52) U.S. Cl.
CPC .............. *F16C 33/583* (2013.01); *C21D 9/40* (2013.01); *F16C 33/64* (2013.01); *F16C 2223/18* (2013.01)

(58) Field of Classification Search
CPC .... F16C 33/583; F16C 33/585; F16C 33/586; F16C 33/64
See application file for complete search history.

(56) References Cited

U.S. PATENT DOCUMENTS

| 5,861,067 A * | 1/1999 | Hetzner ................... F16C 33/64 |
| | | 148/326 |
| 7,146,735 B2 | 12/2006 | Bracht et al. |
| 9,939,020 B2 * | 4/2018 | Wagner ................. F16C 33/585 |

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A bearing ring for a rolling-element bearing or plain bearing has at least one first region that is inductively hardened or is configured to be inductively hardened and at least one second region that is not inductively hardened and is not intended to be inductively hardened, and the at least one second region includes at least one stress-relief recess and/or at least one stress-relief projection.

16 Claims, 2 Drawing Sheets

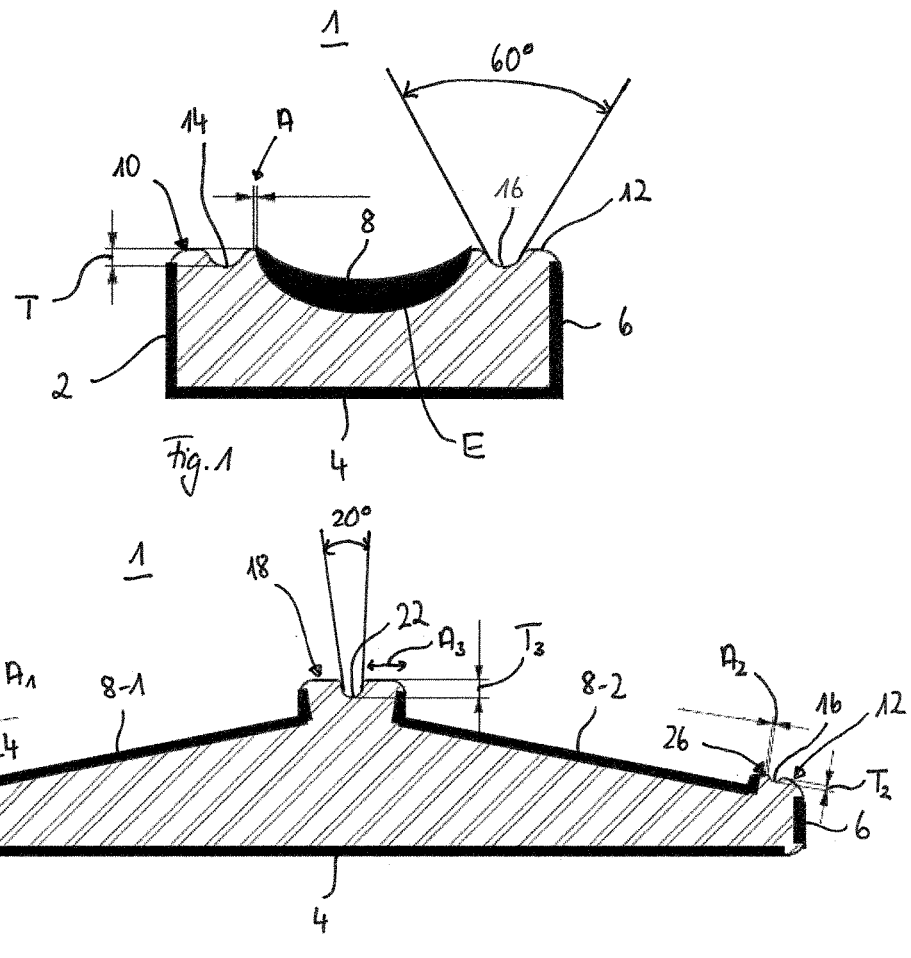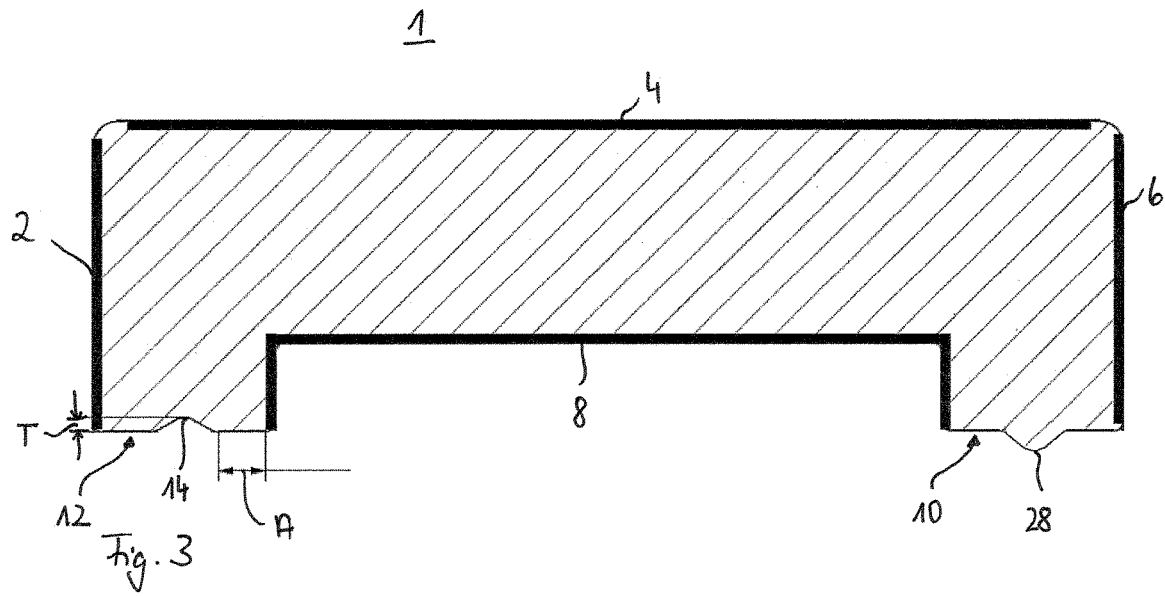

BEARING RING

CROSS-REFERENCE

This application claims priority to German patent application no. 10 2018 212 775.1 filed on Jul. 31, 2018, the contents of which are fully incorporated herein by reference.

TECHNOLOGICAL FIELD

The present disclosure is directed to a bearing ring for a rolling-element bearing or a plain bearing including at least one first region is or will be inductively hardened and at least one second region is not or will not be hardened.

BACKGROUND

It is known from the prior art to inductively harden heavily loaded surfaces of bearing rings in order to obtain sufficient hardness and resistance against mechanical stresses. Here an induction-hardening method for setting certain surface layer conditions is based on a structural transformation as a result of material-specific thermal treatments and generally can be divided into a step of heating to a temperature above the austenitizing temperature and optionally a subsequent step of quenching to a temperature below the martensite-start temperature. At least in an edge layer of, for example, the raceway of a bearing ring of a rolling-element bearing, this thereby results in a transformation into an austenitic structure, while in the interior the initial microstructure remains. Due to the processing of only partial surfaces and due to a good controlling of the hardness values and of the hardness curve, induction hardening is used increasingly often.

However it is disadvantageous that in the course of the induction process a thermal expansion of the material arises, which is critical in particular in the hardened regions, since in these regions particularly high stresses arise that can lead to an unwanted formation of cracks.

SUMMARY

It is therefore an aspect of the present disclosure to provide a bearing ring in which the risk of crack formation is reduced.

In the following a bearing ring of a rolling-element or plain bearing is presented including at least one first region to be inductively hardened and at least one second region not to be hardened. In order to counteract the formation of cracks, at least one stress-relief recess and/or at least one stress-relief projection is formed on the second not-to-be-hardened region. This recess or projection makes it possible that due to these second regions the thermal expansion/contraction of the to-be-hardened first regions during heat-treating of the bearing ring is facilitated so that stresses in the bearing ring can be reduced in a targeted manner. Due to the recess or the projection the thermal expansion of the material or the thermal contraction of the material in the first region can be promoted so that a stress-induced crack formation is counteracted. The not-to-be-hardened region preferably abuts against the to-be-hardened region or lies between two to-be-hardened regions. The not-to-be-hardened region and the to-be-hardened region particularly preferably abut against each other approximately at right angles. A particularly effective crack prevention is achieved when the not-to-be-hardened region is disposed between two essentially parallel to-be-hardened regions and lies at right angles to both to-be-hardened regions. Here the at least one stress-relief recess and/or at least one stress-relief projection is particularly preferably disposed centrally in the not-to-be-hardened region.

It is advantageous in particular here when all not-to-be-hardened regions are equipped with at least one stress-relief recess and/or at least one stress-relief projection. Stress-relief elements can thereby be applied in particular to the bearing ring shoulders and/or flanges of the raceway, which stress-relief elements counteract the crack formation often occurring in the hardened regions.

According to a further advantageous exemplary embodiment, the stress-relief recess and/or projection abuts against the to-be-hardened region or is disposed at a short distance there from. Here the stress-relief recess and/or projection is preferably disposed at a distance of less than twice the hardening depth. In this region the elasticity of the material is greater than in the hardened region wherein the stress build-up is particularly large during hardening, so that stress-relief recesses or projections are particularly effective here. The provided stress-relief recesses or projections are thus not disposed in the region of the greatest stresses, but rather in an adjacent region of lower hardness but greater elasticity, so that the stresses in the hardened region are transmitted in a targeted manner to the adjacent regions. In this manner the stresses in the hardened region are reduced overall and increased in the adjacent region. A uniform stress profile is thereby obtained in the region of the hardened region. In the region of the stress-relief recesses or projections a plastic deformation can also result via an elastic deformation. One advantageous embodiment here provides that the stress-relief recess and/or projection is disposed on a flange or shoulder delimiting a raceway.

According to a further advantageous exemplary embodiment the stress-relief recess and/or projection extends circumferentially around the entire bearing ring. Alternatively or additionally, however, it is also possible that the stress-relief recess and/or projection is at least partially configured as a discrete element, so that a plurality of discretely configured stress-relief recesses and/or projections extend circumferentially around the bearing ring in the not-hardened zone. Both alternatives allow for a sufficient stress relief in the material during thermal expansion or contraction during the induction treatment.

A further advantageous exemplary embodiment of the bearing ring is equipped with a stress-relief recess and/or projection that includes at least one side wall that is set at an angle of more than 10° and less than 80°, preferably approximately 30° to 60°, with respect to the radial direction of the bearing ring. This means that the stress-relief recess/projection has an opening angle that falls in a range between 20° and 160°, preferably between 60° and 120°. With such angled designs the material expansion/contraction can be accommodated particularly well and thus a crack formation can be counteracted.

Furthermore it is advantageous if a depth of the stress-relief recess and/or a height of the stress-relief projection is approximately 0.5 to 2 times, preferably 1 to 1.5 times, that of the heat-influence zone. A "heat-influence zone" is understood to be the zone that abuts directly against the to-be-hardened region. Due to the adapting of the depth/height of the stress-relief recess/projection the geometry change (expansion/contraction) of the bearing ring can be accommodated particularly well without a crack formation being expected in the material.

According to an aspect of the disclosure, a bearing ring for a rolling-element bearing or plain bearing includes a raceway inductively hardened to a first depth, a circumferential region adjacent to the raceway that is not inductively hardened, and an annular region that is inductively hardened to a second depth less than the first depth. The circumferential region is located between the raceway and the annular region, and the circumferential region includes at least one circumferentially extending stress-relief recess and/or at least one circumferentially extending stress-relief projection.

The formation of a stress-relief recess/projection in bearing rings of rolling-element bearings is particularly preferred since their geometry promotes a strong stress increase during hardening. By providing stress-relief recesses/projections this promoting can be counteracted so that crack formation is significantly reduced.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 is a sectional view through a bearing ring according to a first preferred exemplary embodiment of the disclosure.

FIG. 2 is a sectional view through a bearing ring according to a second preferred exemplary embodiment of the disclosure.

FIG. 3 is a sectional view through a bearing ring according to a third preferred exemplary embodiment of the disclosure.

DETAILED DESCRIPTION

Figure 4:
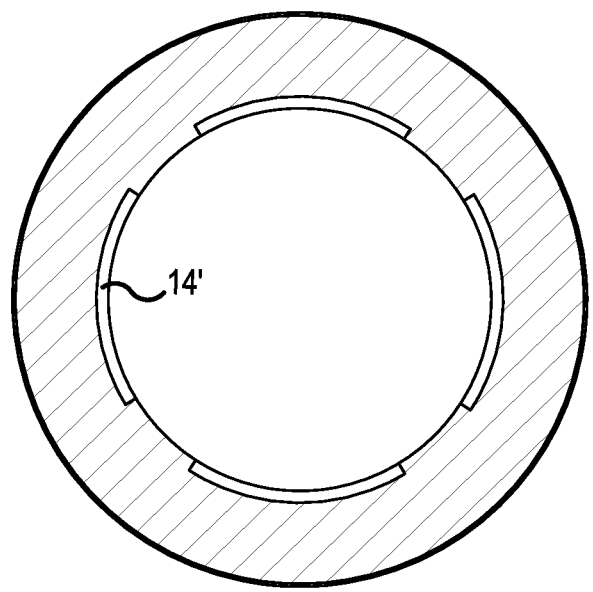
FIG. 4 is a sectional view through a bearing ring according to a fourth preferred exemplary embodiment.

In the following, identical or functionally equivalent elements are designated by the same reference numbers.

In FIGS. 1 to 3, different bearing rings 1 are shown that are each equipped with stress-relief recesses/stress-relief projections.

FIG. 1 schematically shows a sectional representation of a bearing ring 1 that is used, for example, in a deep groove ball bearing. Here the bearing inner ring 1 includes inner ring outer surfaces 2, 4 and 6, which although inductively hardened are not subjected to any particularly increased loading. In contrast the raceway 8 is heavily loaded and therefore must be made particularly hard due to the contact with rolling elements (not shown). The penetration depth of the inductive hardening on the raceway 8 is thus significantly greater than on the side surfaces 2, 4 and 6. This is characterized by the differently thick black regions in FIG. 1.

Furthermore FIG. 1 shows that not-hardened regions 10, 12, are present laterally adjacent to the raceway 8, which not-hardened regions 10, 12 are each equipped with a stress-relief recess 14, 16 in the exemplary embodiment depicted. These stress-relief recesses 14, 16 are disposed directly adjacent to or at a very small distance A from the raceway 8, which is inductively hardened, and formed with a relatively great depth T, since the hardening depth E of the raceway 8 is particularly large. Since with a particularly deep hardening depth E the heat-influence zone is also significantly larger and the stress load of the component is particularly large due to thermal expansion, it is advantageous to dimension the stress-relief recess/projection accordingly such that the recessed or raised regions make possible a sufficient geometry change of the bearing ring without leading to crack formation.

Figure 5:
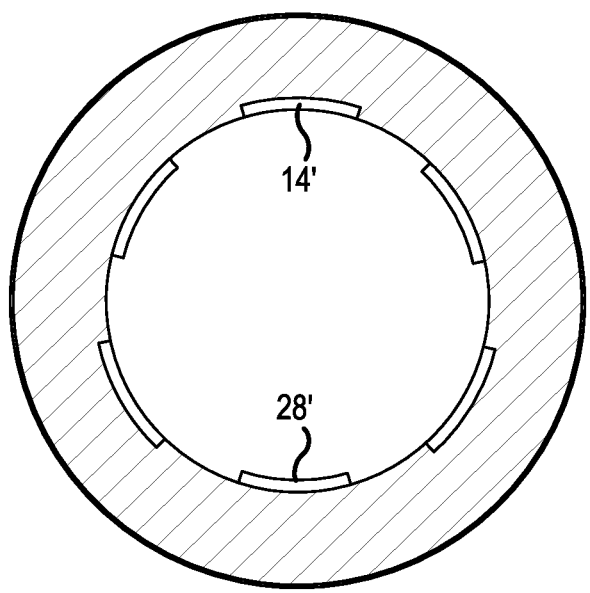
FIG. 5 is a sectional view through a bearing ring according to a fifth preferred exemplary embodiment.

FIG. 1 further shows that the side walls of the stress-absorption recess 16 are arranged with respect to a radial direction of the bearing ring such that altogether they form an opening angle of 60°. In the exemplary embodiment depicted the side walls of the recess 16 are configured symmetrically; however it is also possible to design the side walls with different inclinations. It is also depicted that the recesses 14 and 16 are configured identically. However, it is also possible that the recesses 14, 16 have different geometries, or even that one of the stress-relief recesses is configured as a stress-relief projection. Furthermore one of the stress-relief recesses 14, 16 can also be configured as a continuous groove extending circumferentially, while the other stress-relief recesses 14' are configured as a plurality of discrete circumferentially distributed stress-relief elements as illustrated in FIGS. 4 and 5. Here the stress-relief elements can be configured as discrete recesses 14' and/or as discrete projections 28', wherein projection and recess can even alternate in turn.

FIG. 2 shows a further preferred exemplary embodiment of a bearing ring 1 that is used in a roller bearing, in particular a double row tapered roller bearing. In this exemplary embodiment there are also inductively hardened bearing ring outer surfaces 2, 4, 6, which although inductively hardened need not withstand any particularly heavy loads. In contrast the raceways 8-1, 8-2 are in direct rolling-element contact and must withstand heavy loads. Not-hardened regions 10, 12, 18 are in turn provided between and laterally to the raceways 8-1, 8-2; the not-hardened regions 10, 12, 18 are each provided with stress-relief recesses 14, 16, 22. The lateral surfaces of the retaining flanges and guide flanges, which lateral surfaces face the raceways, are also inductively hardened and are defined as regions of the raceways 8-1, 8-2. The stress-relief recesses 14, 16, 22 extend essentially parallel to or at the opening angle, reduced by half, with respect to the hardened edge layer of the retaining flanges and guide flanges.

As can furthermore be seen from FIG. 2, all stress-relief recesses 14, 16, 22 are different from each other, wherein their different design is due to the specific geometric design of the bearing ring.

The opening angles of the recesses 14, 16, 22, for example, thus vary over the workpiece. As shown in FIG. 2, the opening angle on the edge-side recesses 14, 16 is significantly larger than the opening angle in the central recess 22. Furthermore FIG. 2 shows that the depth $T_1$, $T_2$, $T_3$ and analogously of course also the height of the stress-relief recess/projection need not be equal for each recess/projection in a component, but rather, as shown in particular in FIG. 2, the recess 14 is significantly deeper than the recess 16, and the central recess 22 has the greatest depth $T_3$. This is due in particular to the fact that the recess depth $T_1$, $T_2$, $T_3$ depends in particular on the distance $A_1$, $A_2$, $A_3$ to the hardened surface, i.e., the heat-influence zone. Thus, for example, the heat-influence zone $A_1$ of the recess 14 is significantly larger than the heat-influence zone $A_2$ of the recess 16. The depth of each recess is preferably 1 to 1.5 times the width of the associated heat-influence zone A.

FIG. 3 shows an exemplary embodiment of a bearing outer ring 1 including two lateral flanges of a bearing such as a cylindrical roller bearing or a plain bearing that also specifically includes hardened but not so heavily loaded outer sides 2, 4, 6, and a heavily loaded raceway 8. Here the hardened edge layer of the two flanges abuts directly against the raceway 8 or is subsumed under the term "raceway." In addition to the different design as a bearing outer ring the exemplary embodiment shown includes a stress-relief recess 14 on the not-hardened region 12, and a stress-relief projection 28 on the not-hardened region 10.

In all exemplary embodiments of FIGS. 1, 2 and 3, the stress-relief recesses and/or stress-relief projections lie in a not-to-be-hardened region 10, 12, 18, 24 and 26 that abuts essentially at right angles directly against to-be-hardened regions 2, 6, 8, wherein the not-to-be-hardened region 10, 12, 18, 24 and 26 lies essentially orthogonally between two hardened regions 2 and 8, 6 and 8, 8-1, and 8-2. Here the hardened edge layers of the hardened regions 2, 6, 8 are configured essentially parallel to each other in this region of the flanges or bearing shoulders.

As mentioned above, the stress-relief recess 14, 16, 22 and the stress-relief projection 28 can extend circumferentially along the bearing rings 1 as grooves or ribs; however it is also possible to design the stress-relief recess or the stress-relief projection as discrete elements in the form of humps or holes. It is advantageous here if a plurality of stress-relief recesses or projections are distributed around the circumference of the bearing ring, so that even with discrete stress-relief recesses/projections a sufficient geometry change in the bearing ring can counteract crack formation.

Since the stress-relief recess allows for stress relief in particular in the case of an expansion of the bearing ring, the projection on the other hand counteracts crack formation in the event of a contraction, it is furthermore advantageous if both recesses and projections are present. In particular in the case of discretely formed stress-relief elements it is advantageous in turn so that, for example, in the exemplary embodiment of FIG. 3 a projection 28 would follow the recess 14 in the circumferential direction, and a recess 14 would follow the projection 28 in the circumferential direction. Both a plurality of recesses and a plurality of projections can thus be present in alternating sequence on the not-to-be-hardened region 10, 12. Both stresses during heating and stresses during subsequent quenching can thereby be absorbed.

Overall a thermal expansion/thermal contraction of the material is promoted by the providing of stress-absorbing-recesses and/or projections in the soft material, i.e., in the not-hardened region, and stresses in the component are reduced in a targeted manner so that crack formation can be counteracted.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing ring for a rolling-element bearing or plain bearing comprising:
    a plurality of first regions that are inductively hardened and at least one second region that is not inductively hardened, the at least one second region including at least one stress-relief recess and/or at least one stress-relief projection,
    wherein a first one of the plurality of first regions comprises a bearing raceway and a second one of the plurality of first regions does not include a bearing raceway.

2. The bearing ring according to claim 1,
    wherein the at least one second region comprises two second regions; and
    wherein each one of the two second regions includes at least one stress-relief recess and/or at least one stress-relief projection.

3. The bearing ring according to claim 1, wherein the at least one stress-relief recess and/or at least one stress-relief projection is disposed adjacent to the first one of the plurality of first regions.

4. The bearing ring according to claim 1, wherein the at least one stress-relief recess and/or at least one stress-relief projection extends circumferentially around the bearing ring.

5. The bearing ring according to claim 1, wherein the at least one stress-relief recess and/or stress-relief projection includes at least one side wall extending at an angle of more than 30° and less than 60° with respect to a radial direction of the bearing ring.

6. The bearing ring according to claim 1,
    wherein the at least one stress-relief recess and/or stress-relief projection is spaced from the at least one first region by a distance, and
    wherein a depth of the at least one stress-relief recess and/or a height of the at least one stress-relief projection is 1 to 1.5 times the distance.

7. The bearing ring according to claim 1 wherein the bearing ring is a bearing ring of a rolling-element bearing.

8. The bearing ring according to claim 1,
    wherein the at least one stress-relief recess and/or stress-relief projection is spaced from the first one of the plurality of first regions by a distance that is less than twice an inductive hardening depth of the first one of the plurality of first regions, wherein the at least one stress-relief recess and/or stress-relief projection comprises a plurality of discretely formed stress-relief recesses and/or stress-relief projections distributed circumferentially around the bearing ring, wherein the at least one stress-relief recess and/or at least one stress-relief projection includes at least one side wall extending at an angle of more than 30° and less than 60° with respect to a radial direction of the bearing ring, and wherein a depth of the at least one stress-relief recess and/or a height of the at least one stress-relief projection is 1 to 1.5 times the distance.

9. The bearing ring according to claim 8, wherein the plurality of stress-relief projections alternate circumferentially with the plurality of stress-relief recesses.

10. A bearing ring for a rolling-element bearing or plain bearing comprising:

at least one first region that is inductively hardened and at least one second region that is not inductively hardened, the at least one second region including at least one stress-relief recess and/or at least one stress-relief projection, wherein the at least one stress-relief recess and/or stress-relief projection is spaced from the at least one first region by a distance that is less than twice an inductive hardening depth of the at least one first region.

11. The bearing ring according to claim 10, wherein the at least one first region comprises a plurality of first regions; and wherein a first one of the plurality of first regions comprises a bearing raceway and a second one of the plurality of first regions does not include a bearing raceway.

12. A bearing ring for a rolling-element bearing or plain bearing comprising:

at least one first region that is inductively hardened and at least one second region that is not inductively hardened, the at least one second region including at least one stress-relief recess and/or at least one stress-relief projection, wherein the at least one stress-relief recess and/or stress-relief projection comprises a plurality of discretely formed stress-relief recesses and/or stress-relief projections distributed circumferentially around the bearing ring.

13. The bearing ring according to claim 12, wherein the plurality of stress-relief projections alternate circumferentially with the plurality of stress-relief recesses.

14. The bearing ring according to claim 12, wherein the at least one first region comprises a plurality of first regions; and wherein a first one of the plurality of first regions comprises a bearing raceway and a second one of the plurality of first regions does not include a bearing raceway.

15. A bearing ring for a rolling-element bearing or plain bearing comprising:

a plurality of first regions that are inductively hardened and at least one second region that is not inductively hardened, the at least one second region including at least one stress-relief recess and/or at least one stress-relief projection, wherein the at least one second region is located between a first one of the plurality of the first regions and a second one of the plurality of the first regions, and wherein the first one of the plurality of first regions comprises a bearing raceway and the second one of the plurality of first regions does not include a bearing raceway.

16. A bearing ring for a rolling-element bearing or plain bearing comprising:

a raceway inductively hardened to a first depth;

a circumferential region adjacent to the raceway that is not inductively hardened; and an annular region that is inductively hardened to a second depth less than the first depth, wherein the circumferential region is located between the raceway and the annular region, and wherein the circumferential region includes at least one circumferentially extending stress-relief recess and/or at least one circumferentially extending stress-relief projection.

* * * * *